US011513765B2

(12) United States Patent
Huang et al.

(10) Patent No.: US 11,513,765 B2
(45) Date of Patent: Nov. 29, 2022

(54) BLUETOOTH AUDIO DEVICE, BLUETOOTH AUDIO SYSTEM AND OPERATING METHOD THEREOF

(71) Applicant: AUDIOWISE TECHNOLOGY INC., Baoshan Township, Hsinchu County (TW)

(72) Inventors: Kuang-Hu Huang, Baoshan Township, Hsinchu County (TW); Jing-Syuan Jia, Baoshan Township, Hsinchu County (TW); Chih-Wei Sung, Baoshan Township, Hsinchu County (TW); Wei-Chung Peng, Baoshan Township, Hsinchu County (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 16/842,132

(22) Filed: Apr. 7, 2020

(65) Prior Publication Data

US 2021/0216274 A1 Jul. 15, 2021

Related U.S. Application Data

(60) Provisional application No. 62/959,229, filed on Jan. 10, 2020.

(51) Int. Cl.
*G06F 3/16* (2006.01)
*H04R 1/10* (2006.01)

(52) U.S. Cl.
CPC .......... *G06F 3/167* (2013.01); *H04R 1/1091* (2013.01); *H04R 2420/07* (2013.01)

(58) Field of Classification Search
CPC .... G06F 3/167; H04R 1/1091; H04R 2420/07
See application file for complete search history.

(56) References Cited

U.S. PATENT DOCUMENTS

| 8,401,520 B2* | 3/2013 | Govindachari | H04M 1/6066 455/411 |
| 2004/0203351 A1* | 10/2004 | Shearer | H04M 1/6066 455/41.1 |
| 2018/0048969 A1* | 2/2018 | Jensen | H04R 25/554 |
| 2018/0084456 A1* | 3/2018 | Gostev | H04W 84/18 |
| 2018/0084606 A1* | 3/2018 | Li | H04W 72/085 |
| 2019/0174232 A1* | 6/2019 | Tong | H04W 4/80 |
| 2019/0200113 A1* | 6/2019 | Kim | H02J 7/342 |
| 2020/0379717 A1* | 12/2020 | Mazur | G01H 3/14 |

* cited by examiner

*Primary Examiner* — Joseph Saunders, Jr.
(74) *Attorney, Agent, or Firm* — McClure, Qualey & Rodack, LLP

(57) ABSTRACT

There is provided a Bluetooth audio system including a gateway, a primary device and at least one slave device. The gateway and the primary device communicate Bluetooth packets therebetween based on the standard Bluetooth communication protocol. The at least one slave device accomplishes synchronization with the primary device using a user-defined Bluetooth communication protocol so as to listen or snoop the Bluetooth packets exchanged between the gateway and the primary device.

17 Claims, 5 Drawing Sheets

BLUETOOTH AUDIO DEVICE, BLUETOOTH AUDIO SYSTEM AND OPERATING METHOD THEREOF

RELATED APPLICATIONS

The present application claims the priority benefit of U.S. Provisional Application Ser. No. 62/959,229, filed on Jan. 10, 2020, the disclosures of which are hereby incorporated by reference herein in their entirety.

BACKGROUND

1. Field of the Disclosure

This disclosure generally relates to a Bluetooth application and, more particularly, to a Bluetooth audio device, a Bluetooth audio system and an operating method thereof with physically separated earphones and microphone.

2. Description of the Related Art

As the True Wireless (TWS) Bluetooth earphones can obtain a better user experience, the conventional Bluetooth Wireless earphones are gradually replaced thereby. On the TWS Bluetooth earphones for mobile phones, in addition to speakers for playing audio content, a microphone is further embedded thereon for receiving the user's talk.

However, as the birth of TWS Bluetooth earphones is to eliminate the bothering signal line connecting between earphones, removing the signal line leads to the microphone being arranged farther from the user's mouth to cause the voice reception to be degraded significantly. In use, as the microphone is far from the user's mouth, the speaker naturally talks in higher volume. In addition, as the speech recognition has become a part of smart control, the poor voice reception further degrades the speech recognition ability. To improve the voice reception, higher cost is spent to improve the earphone chamber design and the signal processing ability, but the improvement is still not significant.

Furthermore, another requirement of the TWS Bluetooth earphones is to reduce the size thereof. Arranging a microphone therein is difficult to reduce the total size and can have high power consumption and high design complexity. For example, if it is desired to take a phone call by knocking the phone or pressing a key, the corresponding sensor(s) and algorithm have to be further integrated therein.

Accordingly, the present disclosure provides a Bluetooth audio device, a Bluetooth audio system and an operating method thereof that physically separate the microphone from the earphone set to solve the problem of poor voice reception.

SUMMARY

The present disclosure provides a Bluetooth audio system and an operating method thereof. The Bluetooth audio system includes a microphone that transmits audio packets and control signals to and from a gateway based on the standard Bluetooth communication protocol. The earphone set thereof synchronizes with the microphone using a user-defined Bluetooth communication protocol to listen or snoop Bluetooth packets transmitted between the microphone and the gateway. The earphone set further plays audio content contained in the received Bluetooth packets.

The present disclosure further provides a Bluetooth audio device in which an earphone is not equipped with a microphone to reduce the size thereof.

The present disclosure provides a Bluetooth audio system including a gateway, a primary device and at least one slave device. The primary device is configured to communicate Bluetooth packets with the gateway based on standard Bluetooth communication protocol. The at least one slave device is physically separated from the primary device, and configured to synchronize with the primary device using a user-defined Bluetooth communication protocol to listen the Bluetooth packets transmitted between the gateway and the primary device.

The present disclosure further provides a Bluetooth audio device configured to perform Bluetooth communication with a computer based on standard Bluetooth communication protocol. The Bluetooth audio device includes a microphone and an earphone set. The microphone is configured to transmit Bluetooth packets to and from the computer within Bluetooth time slots. The earphone set is physically separated from the microphone, and configured to listen the Bluetooth packets within the Bluetooth time slots and play audio packets contained in the Bluetooth packets.

The present disclosure further provides an operating method of a Bluetooth audio system. The Bluetooth audio system includes a gateway, a primary device and a slave device, wherein the primary device and the slave device are physically separated from each other. The operating method includes the steps of: forming a standard Bluetooth connection between the primary device and the gateway; synchronizing the slave device with the primary device using a user-defined Bluetooth communication protocol; listening, using the slave device, Bluetooth packets transmitted between the gateway and the primary device; and playing audio packets contained in the Bluetooth packets by the slave device.

In the Bluetooth audio system of the present disclosure, the portable device or accessary embedded with a microphone is selected to arrange the sensor(s) for detecting the user operation, such as a touch, knocking, pressing and rotation, which is to alter the audio content being played. In this way, it is able to reduce the functions integrated in the earphone set to further reduce the size thereof.

In the Bluetooth audio system of the present disclosure, said listening or snooping of the earphone set is to receive Bluetooth packets transmitted between the microphone and the gateway to perform the audio play or receive control commands. The earphone set is not involved in the Bluetooth communication between the microphone and the gateway.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a TWS Bluetooth audio device that includes physically separated microphone and earphone set so as to solve the problem of poor voice reception and improve the user experience. Meanwhile, a size of the earphone set can further be reduced.

In the present disclosure, when the microphone is to conduct a Bluetooth connection with a gateway using the standard Bluetooth communication protocol, the earphone set is not involved in or does not intervene the Bluetooth connection between the microphone and the gateway. The earphone set only listens or snoops Bluetooth packets transmitted between the microphone and the gateway to receive and play audio content contained therein. That is, during the Bluetooth connection between the gateway and the primary device, the gateway does not see the earphone set but only sees the primary device.

Figure 1:
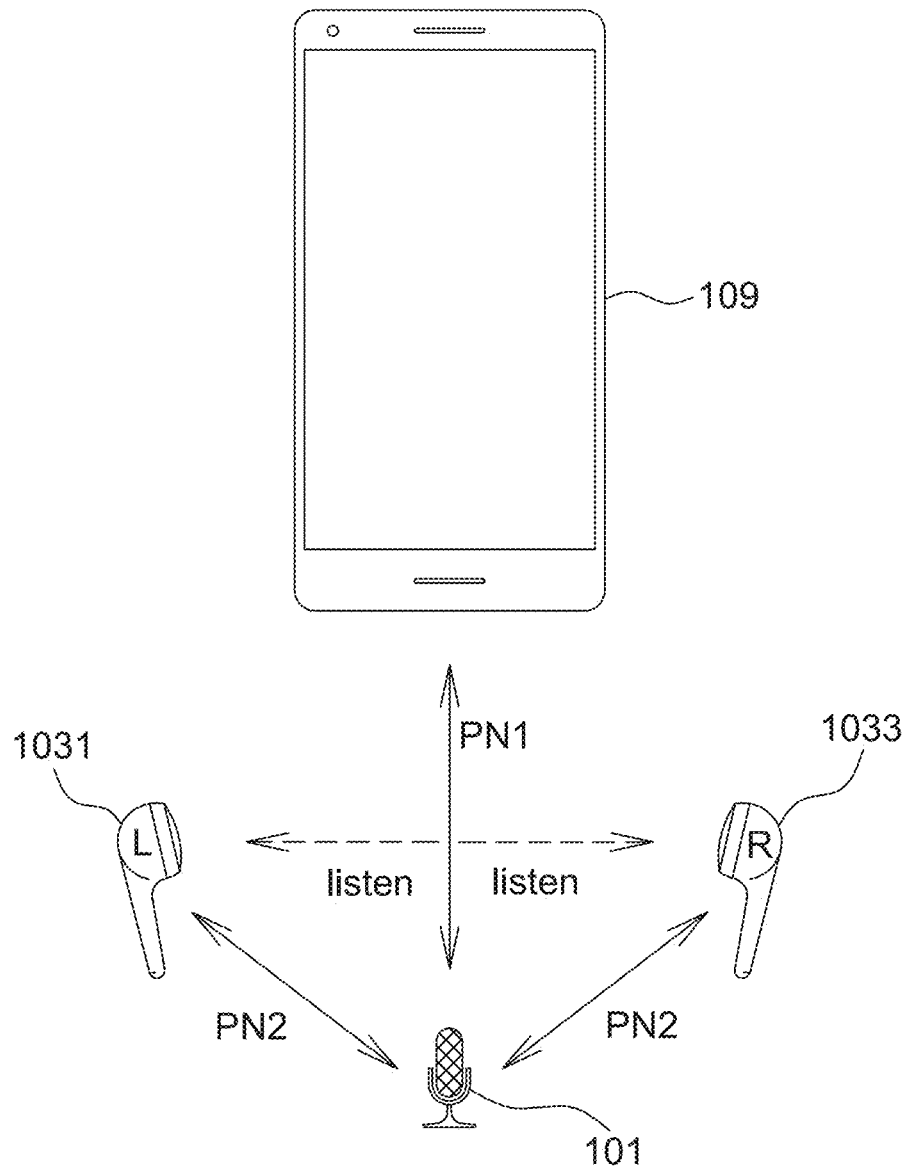
FIG. 1 is a schematic diagram of a Bluetooth audio system according to one embodiment of the present disclosure.

Referring to FIG. 1, it is a schematic diagram of a Bluetooth audio system 100 according to one embodiment of the present disclosure, including a gateway 109 and a Bluetooth audio device. The Bluetooth audio device includes a primary device 101 and at least one slave device (e.g., two earphones 1031 and 1033 being shown herein as an example, but not limited thereto).

In FIG. 1, the gateway 109 is shown by a mobile phone as an example, but the present disclosure is not limited thereto. The gateway 109 is selected from any suitable computer such as a tablet computer, a notebook computer, a desktop computer, a music player or the like.

Figure 2:
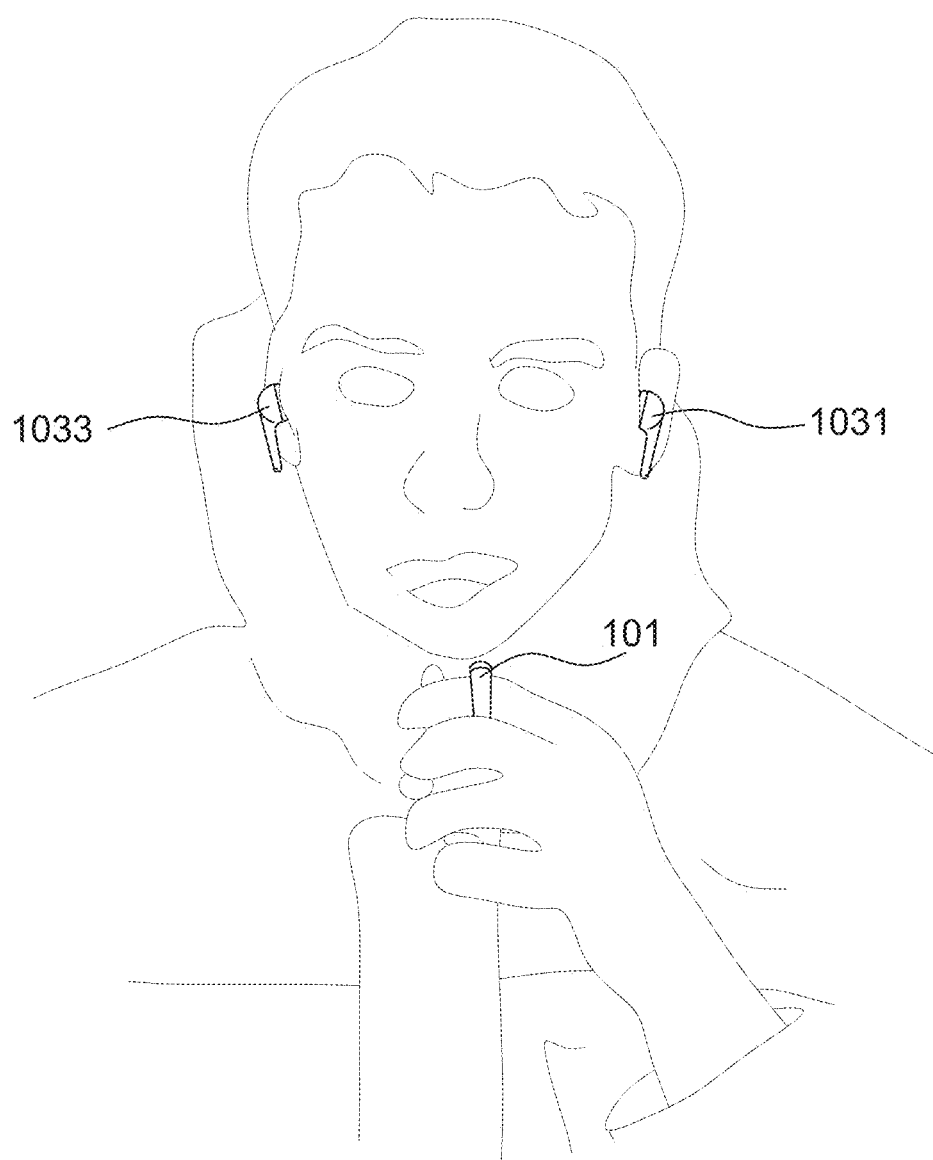
FIG. 2 is a schematic diagram of using a Bluetooth audio system according to one embodiment of the present disclosure.

In FIG. 1, the primary device 101 is shown by a microphone, but the present disclosure is not limited thereto. In the present disclosure, the primary device 101 is an individual device (as shown in FIG. 1), or embedded in other user's portable device or accessary, e.g., a ring (as shown in FIG. 2), a watch, a bracelet, a necklace, a charging box or the like, as long as the microphone is physically separated from the earphone set. During operation, the user only needs to move the microphone close to his/her mouth (as shown in FIG. 2) to obtain good voice reception.

The charging box is for charging the earphones 1031 and 1033 and the microphone such that when the Bluetooth audio device is not used, the microphone and the earphone set are all contained in the charging box for recharging.

The Bluetooth audio device performs the Bluetooth communication with the computer based on the standard Bluetooth communication protocol. For example, the microphone transmits Bluetooth packets to and from the computer within Bluetooth time slots, e.g., time slots TS1 to TS4 shown in FIG. 3A.

For example, within the time slot TS1, the gateway 109 transmits the Bluetooth packet containing the control signal and/or audio content to the primary device 101 within interval (a); in the time slot TS2, the primary device 101 replies an acknowledgement (ACK) or a non-acknowledgement (NACK) to the gateway 109 within interval (c); in the time slot TS3, the microphone of the primary device 101 generate an audio packet that is carried in the Bluetooth packets to be transmitted to the gateway 109 within interval (d); and in the time slot TS4, the gateway 109 replies an ACK or NACK to the primary device 101 within interval (e). Using the above procedure, the gateway 109 can exchange the Bluetooth packets with the primary device 101 in successive time slots. The codes of various Bluetooth packets are known to the art and thus details thereof are not described herein.

The primary device 101 performs a Bluetooth connection with the gateway 109 using the standard Bluetooth communication protocol. For example, in one aspect of implementing the Bluetooth connection between the primary device 101 and the gateway 109, the primary device 101 serves as an advertiser that advertises ADV_DIURECT_IND packets at a predetermined period; after receiving the advertising packet, the gateway 109 serves as an initiator that replies a request CONNECT_REQ carrying the parameter, e.g., including the time point and the channel for transmitting and receiving data, in the following communication timing. Finally, the primary device 101 and the gateway 109 switch to the defined channel at the defined time point based on the parameter embedded in the CONNECT_REQ to transmit and receive data therebetween. As the standard Bluetooth communication protocol is known to the art, details thereof are not described herein.

It is appreciated that the primary device 101 and the gateway 109 respectively include a Bluetooth chip which is integrated with software and firmware for performing the above Bluetooth connection so as to form a first piconet PN1 between the primary device 101 and the gateway 109.

In the present disclosure, the slave devices 1031 and 1033 respectively include a speaker to play audio packets sniffed from the received Bluetooth packets. For example, the slave devices 1031 and 1033 are a TWS Bluetooth earphone set without any embedded microphone.

The slave devices 1031 and 1033 are physically separated from the primary device 101, and form a second piconet PN2 therebetween. The first piconet PN1 and the second piconet PN2 accomplish the synchronization through the scatternet therebetween. More specifically, the slave devices 1031 and 1033 accomplish the synchronization with the primary device 101 using a user-defined Bluetooth communication protocol in order to listen or snoop the Bluetooth packets transmitted between the gateway 109 and the primary device 101. For example, before or after the gateway 109 accomplishes a Bluetooth connection with the primary device 101, the primary device 101 informs the earphone set regarding the time interval and the channel (or frequency) that will be used in transmitting Bluetooth packets between the primary device 101 and the gateway 109 such that the earphone set enters a connection mode at the time point, e.g., the Bluetooth time slots TS1 and TS3 shown in FIG. 3A, defined by the user-defined Bluetooth communication protocol to listen and snoop the Bluetooth packets at the defined channel. After receiving the Bluetooth packets, the earphone set plays audio packets contained in the received Bluetooth packets.

Figure 3A:
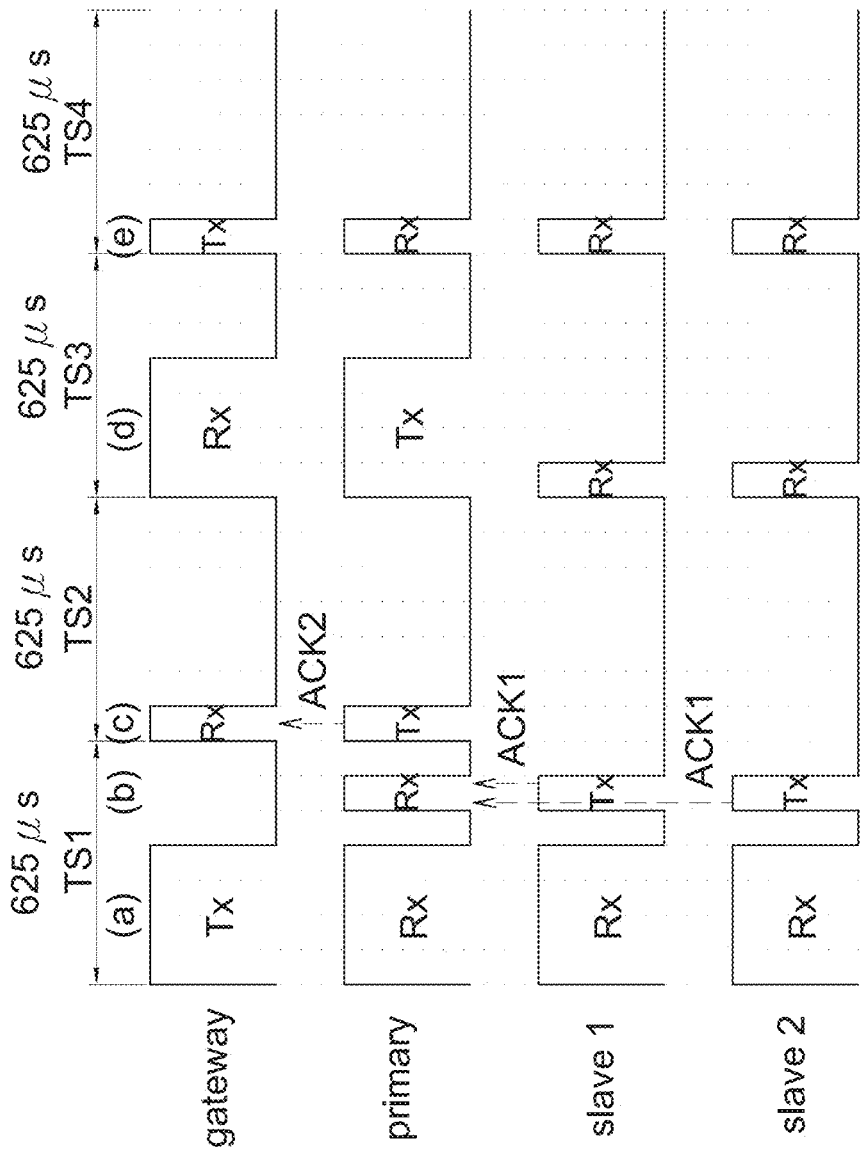
FIG. 3A is an operational timing diagram of a Bluetooth audio system according to one embodiment of the present disclosure.

In addition, after receiving the Bluetooth packets, the earphone set replies an acknowledgement ACK1 to the primary device 101 within a residual interval (e.g., interval (b) shown in FIG. 3A) of the Bluetooth time slot (e.g., TS1 shown in FIG. 3A) in which the Bluetooth packets are received to confirm the receiving of the Bluetooth packets.

In addition, after receiving the ACK1 from the earphone set, the primary device 101 replies another acknowledgement ACK2 to the gateway 109 in a next Bluetooth time slot (e.g., the interval (c) of TS2 shown in FIG. 3A). It should be mentioned that the primary device 101 sends the ACK2 to the gateway 109 after receiving the ACK1 from every earphone, respectively. The ACK1 from different earphones are sent to the primary device 101 within the same Bluetooth time slot, or within different Bluetooth time slots (e.g., in the case that a Bluetooth packet is resent). In other words, the primary device 101 communicates with the gateway 109 on behalf of the Bluetooth audio device.

Figure 4:
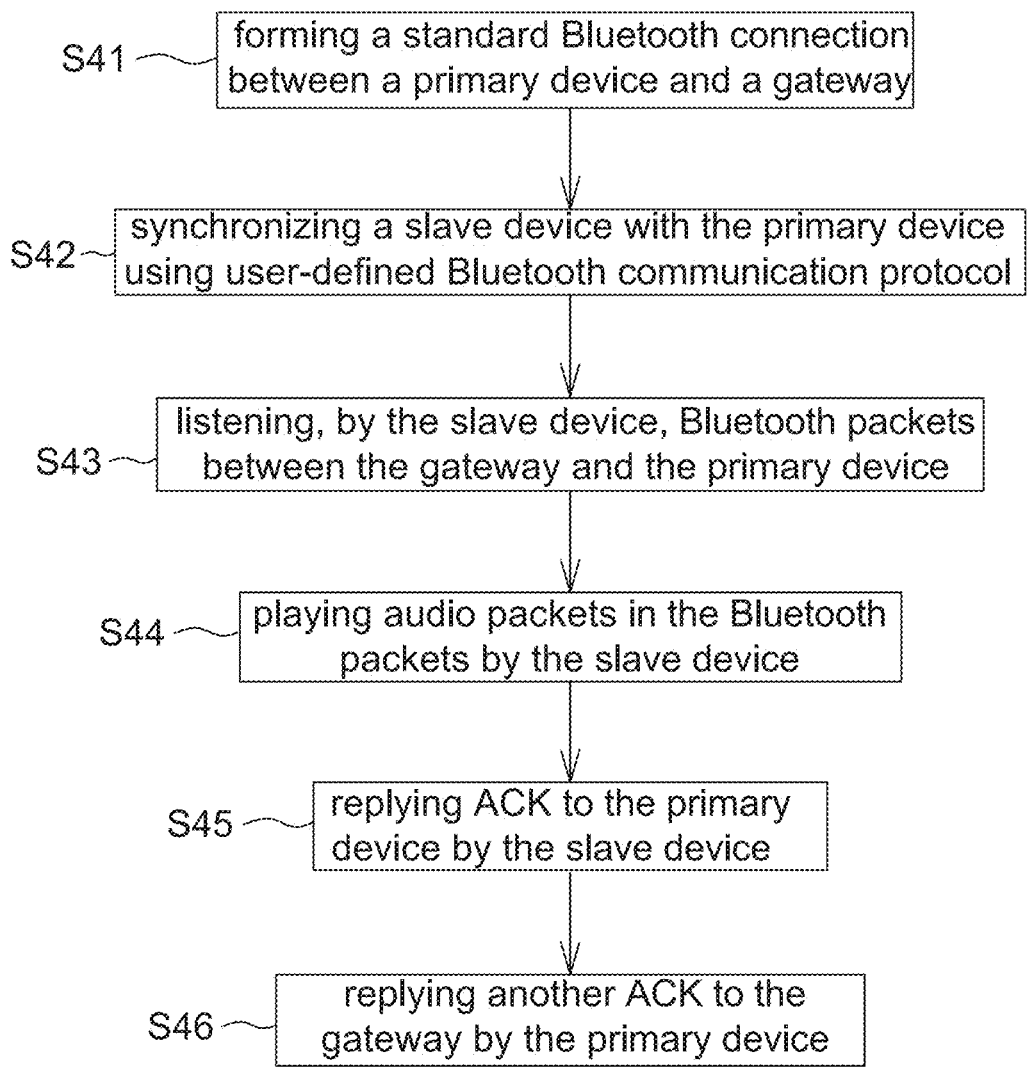
FIG. 4 is a flow chart of an operating method of a Bluetooth audio system according to one embodiment of the present disclosure.

Please referring to FIG. 4, it is a flow chart of an operating method of a Bluetooth audio system according to one embodiment of the present disclosure, and the operating method is adapted to the Bluetooth audio system 100 shown in FIGS. 1 and 2. The operating method includes: forming a standard Bluetooth connection between a primary device and a gateway (Step S41); synchronizing a slave device with the primary device using a user-defined Bluetooth communication protocol (Step S42); listening, using the slave device, Bluetooth packets transmitted between the gateway and the primary device (Step S43); playing audio packets contained in the Bluetooth packets by the slave device (Step S44); replying an acknowledgement to the primary device by the slave device (Step S45); and replying another acknowledgement to the gateway by the primary device (Step S46).

Please referring to FIGS. 1, 3A and 4 together, one aspect of the operating method is illustrated hereinafter.

Step S41: At first, the primary device 101 and the gateway 109 accomplish a standard Bluetooth connection based on the standard Bluetooth communication protocol to exchange Bluetooth packets between the primary device 101 and the gateway 109. As the present disclosure is adapted to the Bluetooth audio system, said Bluetooth packets mainly contain audio packets and other control signals, e.g., commands for controlling volume, connection and disconnection.

Step S42: Before or after the standard Bluetooth connection between the primary device 101 and the gateway 109 is accomplished, the primary device 101 accomplishes the synchronization with the slave devices 1031 and 1033 using a user-defined Bluetooth communication protocol. For example, the primary device 101 informs, before or after the standard Bluetooth connection between the primary device 101 and the gateway 109, the slave devices 1031 and 1033 regarding the time interval and the channel that will be used to transmit Bluetooth packets between the primary device 101 and the gateway 109 such that the slave devices 1031 and 1033 are able to listen and snoop the Bluetooth packets transmitted between the primary device 101 and the gateway 109 in the following steps at the defined time point and the defined channel.

Step S43-S44. For example, within the interval (a) of the Bluetooth time slot TS1 (e.g., 625 μs), the gateway 109 transmits a Bluetooth packet to the primary device 101, and the slave devices 1031 and 1033 listen and snoop the Bluetooth packet within the same interval (a) (e.g., known from the received information based on the user-defined Bluetooth communication protocol). The slave devices 1031 and 1033 then play audio packets contained in the received Bluetooth packets.

Step S45: After receiving one Bluetooth packet, the slave devices 1031 and 1033 reply an acknowledgement ACK to the primary device 101 within a residual interval (e.g., interval (b)) of the Bluetooth time slot TS1 in which the Bluetooth packet is received. In the present disclosure, the slave devices 1031 and 1033 do not send any acknowledgement to the gateway 109, but sends the acknowledgement ACK1 only to the primary device 101.

Step S46: After receiving the ACK1 from the slave devices 1031 and 1033, the primary device 101 replies another acknowledgement ACK2 to the gateway 109 in a next Bluetooth time slot (e.g., TS2). As mentioned above, it is possible that different slave devices 1031 and 1033 send the ACK1 to the primary device 101 within different Bluetooth time slots, and the primary device 101 replies the ACK2 to the gateway 109 only receiving both ACK1 from both slave devices 1031 and 1033.

That is, when the primary device 101 does not receive the ACK1 from the slave devices 1031 or 1033, or receives a non-acknowledgement NACK from the slave devices 1031 and/or 1033, the primary device 101 does not transmit the ACK2 or transmits another NACK to the gateway 109 in the next Bluetooth time slot (e.g., TS2). In addition, when the gateway 109 does not receive the ACK2 or receives the NACK in the next Bluetooth time slot, it means that at least one of the slave devices 1031 and 1033 as well as the primary device 101 does not receive a Bluetooth packet sent previously and thus the previous Bluetooth packet is resent.

In the Bluetooth time slot TS3, the primary device 101 converts the user's talk to an audio packet to be embedded in the Bluetooth packet to be sent to the gateway 109. Meanwhile, the slave devices 1031 and 1033 are switched to a state of listening the transmitted Bluetooth packet and play the talk. By playing the user's talk, the user can have a better user experience.

In the Bluetooth time slot TS4, the gateway 109 sends an acknowledgement to the primary device 101. Meanwhile, the slave devices 1031 and 1033 are also switched to a state of listening the transmitted Bluetooth packet, e.g., confirming whether a listening stop message is contained in the transmitted Bluetooth packet.

Figure 3B:
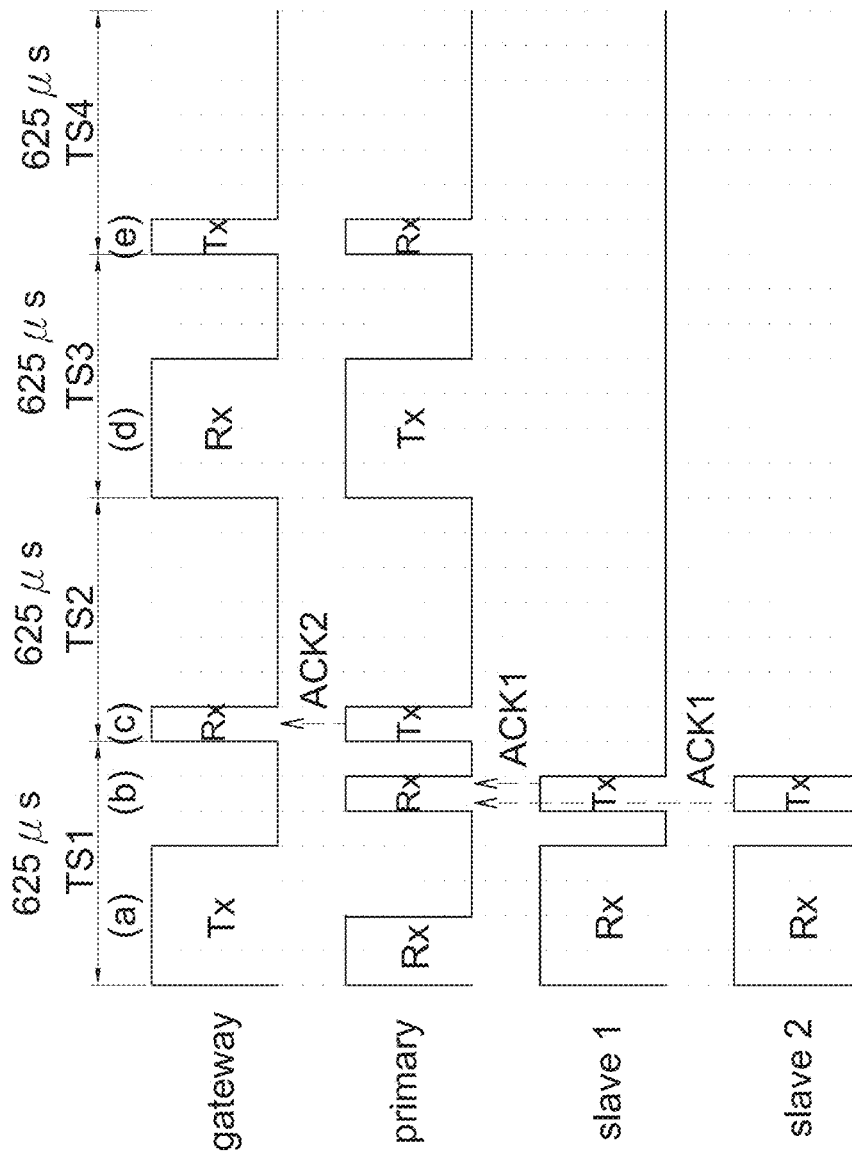
FIG. 3B is an operational timing diagram of a Bluetooth audio system according to another embodiment of the present disclosure.

Referring to FIG. 3B, it is an operational timing diagram of a Bluetooth audio system according to another embodiment of the present disclosure, which is also adapted to the systems in FIGS. 1 and 2. The differences between FIG. 3B from FIG. 3A include:

(1) In the Bluetooth time slot TS1, when the primary device 101 identifies that a Bluetooth packet from the gateway 109 contains only the audio packet without other control messages, the primary device 101 stops receiving the remaining Bluetooth packet to reduce the power consumption if the audio packet will not be used by the primary device 101. That is, the primary device 101 actively shortens the receiving interval (a) according to content of a Bluetooth packet currently being received.

(2) The slave devices 1031 and 1033 of the present disclosure are arranged to listen the Bluetooth packet only from the gateway 109 to the primary device 101 but not to listen the Bluetooth packet from the primary device 101 to the gateway 109 according to different applications. That is, in the Bluetooth time slot TS3, the slave devices 1031 and 1033 are not switched to a state of listening the Bluetooth packet from the primary device 101 to the gateway 109 within the interval (d).

(3) In the Bluetooth time slot TS4, the slave devices 1031 and 1033 are not switched to a state of listening the acknowledgement replied from the gateway 109 to the primary device 101 within the interval (e). Other steps are identical to those in FIG. 3A and thus details thereof are not repeated herein.

In some aspects, the portable device or accessary embedded with a microphone (e.g., 101) is integrated with a physiological detecting function to detect user's physiological signals, e.g., detecting photoplethysmographic (PPG) signal. For example, when the microphone 101 is integrated in a ring (e.g., as shown in FIG. 2), the ring conducts a Bluetooth connection with the gateway 109 only when the ring detects the PPG signal, and the Bluetooth connection is automatically terminated when the ring does not detect the PPG signal, e.g., the SNR of the PPG signal smaller than a threshold, or a heartbeat not detected from the PPG signal.

It should be mentioned that although the above embodiment are illustrated in the way that the earphone set includes two separated earphones 1031 and 1033, the present disclosure is not limited thereto. In the Bluetooth audio system of the present disclosure, it is possible to have multiple earphone sets to listen together the Bluetooth packets between the primary device and the gateway, and said multiple earphone sets all play audio content contained in the Bluetooth packets. In addition, the slave devices are not limited to the earphone set but are other stationary equipment such as speaker box used on a vehicle or in a room without particular limitations as long as it is able to play the audio content contained in the Bluetooth packets.

As mentioned above, in the conventional TWS Bluetooth earphones, a microphone is embedded in one of the earphones such that the microphone is far from the user's mouth to have poor voice reception. Meanwhile, the earphone is further integrated with other control devices, such as controlling to take a phone, select music content or adjust volume, such that it is difficult to further reduce the size thereof. Therefore, the present disclosure further provides a Bluetooth audio device and system having physically separated microphone and earphone set (referring to FIG. 1) and an operating method thereof (FIGS. 3A-4) in which the earphone set listens or snoops Bluetooth packets transmitted between the microphone and a gateway and plays audio content contained in the received Bluetooth packets. In this way, the problem of poor voice reception of the TWS Bluetooth audio device is solved because the microphone can be moved close to the user's mouth. Furthermore, as other functions of the earphone set can be integrated in the portable device or accessary embedded with the microphone, the size of the earphone set is further reduced.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A Bluetooth audio system, comprising:
   a gateway;
   a primary device configured to communicate Bluetooth packets with the gateway based on standard Bluetooth communication protocol; and
   at least one slave device, physically separated from the primary device, and configured to:
   synchronize with the primary device using a user-defined Bluetooth communication protocol, listen to an audio packet contained in the Bluetooth packets transmitted between the gateway and the primary device, and
   reply, upon receiving the Bluetooth packets from the gateway, an acknowledgement to the primary device within a residual interval of a Bluetooth time slot in which the Bluetooth packets are received,
   wherein the primary device is further configured to stop receiving a remainder of one Bluetooth packet when identifying that said one Bluetooth packet from the gateway contains only audio packets without any control message.

2. The Bluetooth audio system as claimed in claim 1, wherein the gateway is a mobile phone, tablet computer, a notebook computer, a desktop computer or a music player.

3. The Bluetooth audio system as claimed in claim 1, wherein the primary device comprises a microphone configured to generate the audio packet which is carried in the Bluetooth packets to be transmitted to the gateway.

4. The Bluetooth audio system as claimed in claim 3, wherein the microphone is an individual device.

5. The Bluetooth audio system as claimed in claim 3, wherein the microphone is arranged in a ring, a watch, a bracelet or a charging box.

6. The Bluetooth audio system as claimed in claim 1, wherein each of the at least one slave device comprises a speaker configured to play the audio packet contained in the Bluetooth packets but does not have any embedded microphone.

7. The Bluetooth audio system as claimed in claim 1, wherein the at least one slave device is a True Wireless Bluetooth earphone set.

8. A Bluetooth audio device, configured to perform Bluetooth communication with a computer based on standard Bluetooth communication protocol, the Bluetooth audio device comprising:
   a microphone configured to transmit Bluetooth packets to and from the computer within Bluetooth time slots; and
   an earphone set, physically separated from the microphone, and configured to
   listen to audio packets contained in the Bluetooth packets transmitted from the microphone to the computer and play the audio packets contained in the Bluetooth packets, and
   reply, upon receiving the Bluetooth packets from the computer, an acknowledgement to the microphone within a residual interval of the Bluetooth time slot in which the Bluetooth packets are received,
   wherein the primary device is further configured to stop receiving a remainder of one Bluetooth packet when identifying that said one Bluetooth packet from the gateway contains only audio packets without any control message.

9. The Bluetooth audio device as claimed in claim 8, wherein the earphone set synchronizes with the microphone using a user-defined Bluetooth communication protocol to listen to the audio packets contained in the Bluetooth packets.

10. The Bluetooth audio device as claimed in claim 9, wherein the user-defined Bluetooth communication protocol comprises informing the earphone set regarding a time interval and a channel that are used in transmitting the Bluetooth packets between the microphone and the computer.

11. The Bluetooth audio device as claimed in claim 8, wherein the microphone is an individual device, and the earphone set does not have any embedded microphone.

12. The Bluetooth audio device as claimed in claim 8, wherein the microphone is arranged in a ring, a watch, a bracelet or a charging box.

13. The Bluetooth audio device as claimed in claim 8, wherein upon receiving the acknowledgement from the earphone set, the microphone is further configured to reply another acknowledgement to the computer in a next Bluetooth time slot.

14. An operating method of a Bluetooth audio system, the Bluetooth audio system comprising a gateway, a primary device and a slave device, wherein the primary device and the slave device are physically separated from each other, the operating method including:
   forming a standard Bluetooth connection between the primary device and the gateway;
   synchronizing the slave device with the primary device using a user-defined Bluetooth communication protocol;
   listening, using the slave device, to audio packets contained in Bluetooth packets transmitted from the primary device to the gateway;
   playing the audio packets contained in the Bluetooth packets by the slave device; and
   upon receiving Bluetooth packets from the gateway, replying an acknowledgement to the primary device by the slave device within a residual interval of a Bluetooth time slot in which the Bluetooth packets are received,
   wherein the primary device is further configured to stop receiving a remainder of one Bluetooth packet when identifying that said one Bluetooth packet from the gateway contains only audio packets without any control message.

15. The operating method as claimed in claim 14, further comprising:
   upon receiving the acknowledgement from the slave device, replying another acknowledgement to the gateway by the primary device in a next Bluetooth time slot.

16. The operating method as claimed in claim 15, further comprising:
   when the primary device does not receive the acknowledgement or receives a non-acknowledgement from the slave device, not replying the another acknowledgement or transmitting another non-acknowledgement in the next Bluetooth time slot to the gateway.

17. The operating method as claimed in claim 16, further comprising:
   resending a previous Bluetooth packet when the gateway does not receive the another acknowledgement or receives the another non-acknowledgement in the next Bluetooth time slot.

* * * * *